United States Patent
De Jonge

(10) Patent No.: US 7,328,782 B2
(45) Date of Patent: Feb. 12, 2008

(54) VEHICLE SHIFTER WITH POWERED PAWL HAVING NEUTRAL LOCK

(75) Inventor: Robert A. De Jonge, West Olive, MI (US)

(73) Assignee: Grand Haven Stamped Products Company, a division of JSJ Corporation, Grand Haven, MI (US)

( * ) Notice: Subject to any disclaimer, the term of this patent is extended or adjusted under 35 U.S.C. 154(b) by 290 days.

(21) Appl. No.: 11/153,067

(22) Filed: Jun. 15, 2005

(65) Prior Publication Data

US 2006/0016286 A1   Jan. 26, 2006

Related U.S. Application Data

(60) Provisional application No. 60/591,012, filed on Jul. 26, 2004.

(51) Int. Cl.
*B60K 20/04* (2006.01)
*B60W 10/10* (2006.01)
*B60W 10/18* (2006.01)

(52) U.S. Cl. ................. 192/220.4; 74/473.21
(58) Field of Classification Search ............. None
See application file for complete search history.

(56) References Cited

U.S. PATENT DOCUMENTS

| D188,528 S | 8/1960 | Markley, Jr. |
|---|---|---|
| 2,988,931 A | 6/1961 | Markley, Jr. et al. |
| 3,104,306 A | 9/1963 | Markley, Jr. |
| 3,572,152 A | 3/1971 | Bruhn, Jr. et al. |
| 3,657,943 A | 4/1972 | Bruhn, Jr. et al. |
| 3,765,264 A | 10/1973 | Bruhn, Jr. |
| 3,774,469 A | 11/1973 | Bruhn, Jr. |
| 3,786,690 A | 1/1974 | Bruhn, Jr. |
| 3,828,625 A | 8/1974 | Bruhn, Jr. |
| 3,902,378 A | 9/1975 | Osborn |
| 3,994,184 A | 11/1976 | Osborn |
| 4,245,521 A | 1/1981 | Osborn |
| 4,282,768 A | 8/1981 | Osborn |
| 4,304,112 A | 12/1981 | Osborn |
| 4,328,712 A | 5/1982 | Osborn |
| 4,343,202 A | 8/1982 | Osborn |
| RE31,451 E | 11/1983 | Osborn |

(Continued)

FOREIGN PATENT DOCUMENTS

EP          1314916          5/2003

(Continued)

*Primary Examiner*—Rodney H. Bonck
(74) *Attorney, Agent, or Firm*—Price, Heneveld, Cooper, DeWitt & Litton LLP

(57) ABSTRACT

A shifter for vehicles including a base structure and a shift lever that is movably mounted to the base structure. A shift gate controls movement of the shift lever between a plurality of control positions including at least PARK, NEUTRAL and DRIVE control positions. The shifter also includes a powered pawl having a pawl member configured to engage the shift gate. The pawl member defines a first position relative to the shift gate wherein the shift lever is locked in the NEUTRAL position. The pawl member also defines a second position relative to the shift gate wherein the shift lever is movable between the PARK, NEUTRAL and DRIVE positions. The pawl member further defines a third position relative to the shift gate wherein the pawl member locks the shift lever in the PARK position.

24 Claims, 5 Drawing Sheets

U.S. PATENT DOCUMENTS

| | | | |
|---|---|---|---|
| 4,515,032 A | 5/1985 | Olmsted |
| 4,569,245 A | 2/1986 | Feldt et al. |
| 4,977,789 A | 12/1990 | Osborn |
| 4,987,792 A | 1/1991 | Mueller et al. |
| 5,044,220 A | 9/1991 | Raff et al. |
| 5,070,740 A | 12/1991 | Giek et al. |
| 5,096,033 A | 3/1992 | Osborn |
| 5,150,633 A | 9/1992 | Hillgärtner |
| 5,167,308 A | 12/1992 | Osborn |
| 5,197,344 A | 3/1993 | Maier et al. |
| 5,211,271 A | 5/1993 | Osborn et al. |
| 5,220,984 A | 6/1993 | Ruiter |
| 5,263,383 A | 11/1993 | Meisch et al. |
| 5,275,065 A | 1/1994 | Ruiter |
| 5,277,077 A | 1/1994 | Osborn |
| 5,277,078 A | 1/1994 | Osborn et al. |
| 5,313,853 A | 5/1994 | Olmsted et al. |
| 5,357,820 A | 10/1994 | Moroto et al. |
| 5,398,565 A | 3/1995 | Brock |
| 5,400,673 A | 3/1995 | Brock |
| 5,402,870 A | 4/1995 | Osborn |
| 5,413,008 A | 5/1995 | Brock |
| 5,415,056 A | 5/1995 | Tabata et al. |
| 5,442,975 A | 8/1995 | Osborn |
| 5,465,818 A | 11/1995 | Osborn et al. |
| 5,490,434 A | 2/1996 | Osborn et al. |
| 5,493,931 A | 2/1996 | Niskanen |
| 5,494,141 A | 2/1996 | Osborn et al. |
| 5,507,199 A | 4/1996 | Lampani |
| 5,556,224 A | 9/1996 | Niskanen |
| 5,588,934 A | 12/1996 | Osborn et al. |
| 5,622,079 A | 4/1997 | Woeste et al. |
| 5,626,093 A | 5/1997 | Jacobs et al. |
| 5,677,658 A | 10/1997 | Osborn et al. |
| 5,680,307 A | 10/1997 | Issa et al. |
| 5,689,996 A | 11/1997 | Ersoy |
| 5,718,312 A | 2/1998 | Osborn et al. |
| 5,759,132 A | 6/1998 | Osborn et al. |
| 5,768,944 A | 6/1998 | Inuzuka et al. |
| 5,775,166 A | 7/1998 | Osborn et al. |
| 5,791,197 A | 8/1998 | Rempinski et al. |
| 5,845,535 A | 12/1998 | Wakabayashi et al. |
| 5,861,803 A | 1/1999 | Issa |
| 5,899,115 A | 5/1999 | Kataumi et al. |
| 5,913,935 A | 6/1999 | Anderson et al. |
| 5,927,150 A | 7/1999 | Hirano et al. |
| 5,934,145 A | 8/1999 | Ersoy et al. |
| 6,089,118 A | 7/2000 | Ishii et al. |
| 6,098,483 A | 8/2000 | Syamoto et al. |
| 6,125,714 A | 10/2000 | Woeste et al. |
| 6,148,686 A | 11/2000 | Kataumi |
| 6,151,977 A | 11/2000 | Menig et al. |
| 6,192,770 B1 | 2/2001 | Miyoshi et al. |
| 6,196,080 B1 | 3/2001 | Lee |
| 6,209,408 B1 | 4/2001 | DeJonge et al. |
| 6,209,410 B1 | 4/2001 | Suzuki |
| 6,223,112 B1 | 4/2001 | Nishino |
| 6,230,579 B1 | 5/2001 | Reasoner et al. |
| 6,237,435 B1 | 5/2001 | Grönhage et al. |
| 6,260,432 B1 | 7/2001 | Ehrmaier et al. |
| 6,295,887 B1 | 10/2001 | DeJonge et al. |
| 6,311,577 B1 | 11/2001 | Wörner et al. |
| 6,325,196 B1 * | 12/2001 | Beattie et al. ........... 192/220.4 |
| 6,382,046 B1 | 5/2002 | Wang |
| 6,401,564 B1 | 6/2002 | Lee |
| 6,405,611 B1 | 6/2002 | DeJonge et al. |
| 6,408,709 B2 | 6/2002 | Kim |
| 6,422,106 B1 | 7/2002 | Lee |
| 6,431,339 B1 | 8/2002 | Beattie et al. |
| 6,439,073 B2 | 8/2002 | Ohashi et al. |
| 6,443,024 B1 | 9/2002 | Skogward |
| 6,474,186 B1 | 11/2002 | Vollmar |
| 6,530,293 B1 | 3/2003 | Rückert et al. |
| 6,536,299 B2 | 3/2003 | Kim |
| 6,550,351 B1 | 4/2003 | O'Reilly et al. |
| 6,553,858 B1 | 4/2003 | Kim |
| 6,568,294 B2 | 5/2003 | Jezewski |
| 6,612,194 B2 | 9/2003 | DeJonge |
| 6,644,142 B2 | 11/2003 | Junge et al. |
| 6,658,952 B2 | 12/2003 | Hayashi et al. |
| 6,732,847 B1 | 5/2004 | Wang |
| 6,761,081 B2 | 7/2004 | Kliemannel |
| 6,761,084 B2 | 7/2004 | Suzuki et al. |
| 6,773,369 B2 | 8/2004 | Altenkirch et al. |
| 6,783,480 B2 | 8/2004 | Masuda et al. |
| 6,848,331 B2 | 2/2005 | Syamoto |
| 6,848,332 B2 | 2/2005 | Hayashi et al. |
| 6,848,560 B2 * | 2/2005 | Inoue ..................... 192/220.5 |
| 6,857,335 B2 | 2/2005 | Kahara |
| 6,865,967 B2 | 3/2005 | Shioji et al. |
| 2003/0172757 A1 | 9/2003 | Yone |
| 2003/0172762 A1 | 9/2003 | Ehrmaler et al. |
| 2003/0188594 A1 | 10/2003 | Levin et al. |
| 2003/0213327 A1 | 11/2003 | Syamoto |
| 2004/0000210 A1 | 1/2004 | Cho |
| 2004/0035237 A1 | 2/2004 | Matsui et al. |
| 2004/0045392 A1 | 3/2004 | Wakayama |
| 2004/0162185 A1 | 8/2004 | Giefer et al. |
| 2004/0168537 A1 | 9/2004 | Koontz |
| 2004/0194567 A1 | 10/2004 | Giefer et al. |
| 2004/0216546 A1 | 11/2004 | Shiomi et al. |
| 2004/0216547 A1 | 11/2004 | Shiomi et al. |
| 2004/0216549 A1 | 11/2004 | Shiomi et al. |
| 2004/0237692 A1 | 12/2004 | Syamoto et al. |
| 2004/0237693 A1 | 12/2004 | Koide |
| 2005/0028633 A1 | 2/2005 | Giefer et al. |

FOREIGN PATENT DOCUMENTS

| | | |
|---|---|---|
| JP | 64458 | 1/1994 |
| JP | 2003162337 | 6/2003 |

* cited by examiner

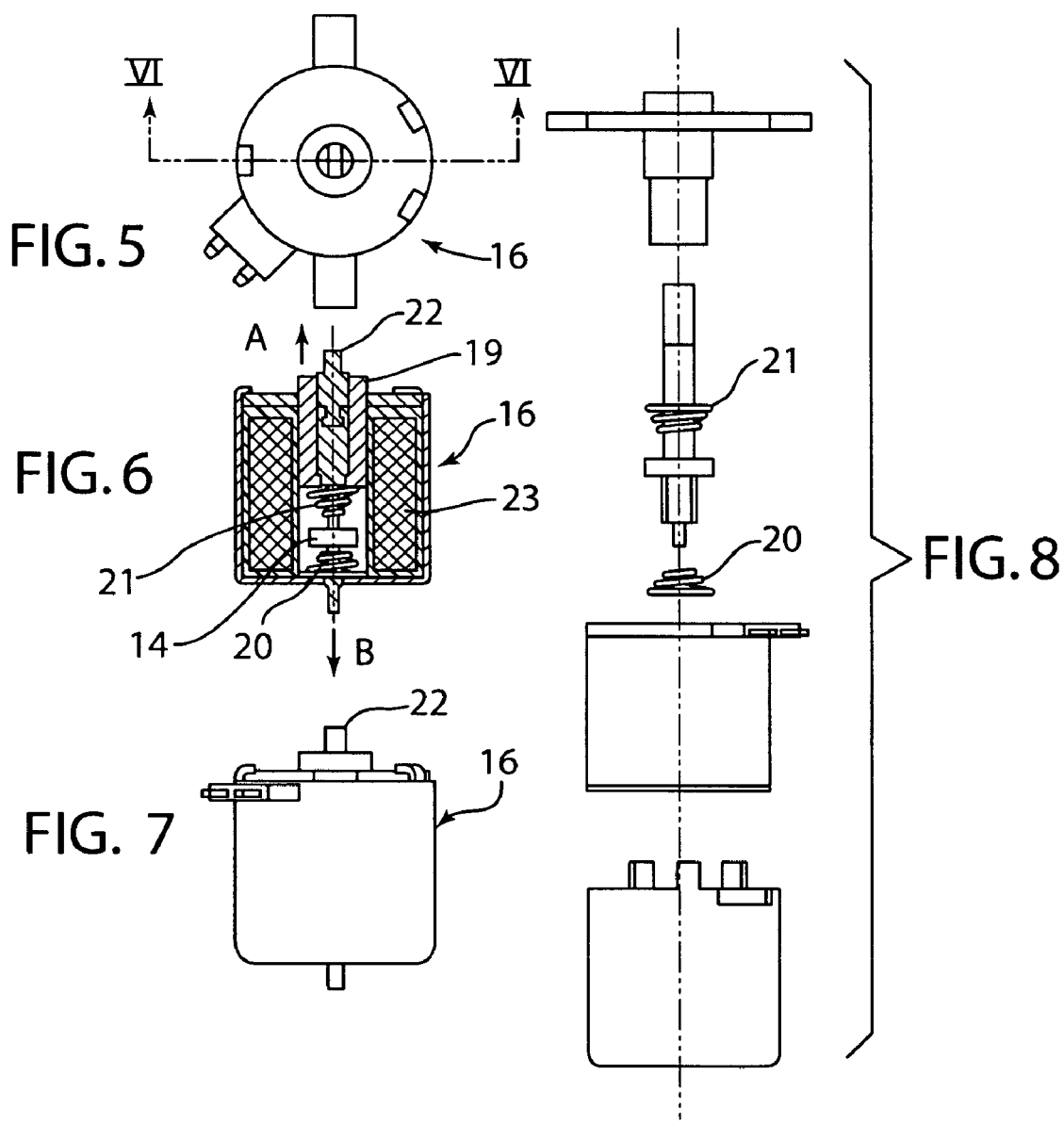

VEHICLE SHIFTER WITH POWERED PAWL HAVING NEUTRAL LOCK

CROSS-REFERENCE TO RELATED APPLICATION

This application claims the benefit of U.S. Provisional Application No. 60/591,012, filed Jul. 26, 2004, the entire contents of which are incorporated by reference.

BACKGROUND OF THE INVENTION

Shifters for automatic transmissions typically include a "PARK" lock that prevents movement of the shift lever from the "PARK" position unless the brake pedal of the vehicle has been depressed by the operator. Shifters for automatic transmissions may also include a "NEUTRAL" lock that prevents movement of the shift lever from the "NEUTRAL" position unless the brake pedal is depressed and the shift actuator button on the shift lever is pushed. Various neutral lock mechanisms have been developed. However, known neutral locks may be quite complicated, causing the devices to be costly and prong to breakdown or other such problems.

SUMMARY OF THE INVENTION

One aspect of the present invention is a shifter for vehicles including a base structure and a shift lever that is movably mounted to the base structure. A shift gate controls movement of the shift lever between a plurality of control positions including at least PARK, NEUTRAL and DRIVE control positions. The shifter also includes a powered pawl having a pawl member configured to engage the shift gate. The pawl member defines a first position relative to the shift gate wherein the shift lever is locked in the NEUTRAL position. The pawl member also defines a second position relative to the shift gate wherein the shift lever is movable between the PARK, NEUTRAL and DRIVE positions. The pawl member further defines a third position relative to the shift gate wherein the pawl member locks the shift lever in the PARK position.

Another aspect of the present invention is a shifter for vehicles including a base structure, a shift lever movably mounted to the base structure, and a shift gate. The shifter also includes a pawl member that is configured to engage the shift gate and control movement of the shift lever relative to the base. A solenoid has a movable output member operably connected to the pawl member, and the movable output member is biased towards an intermediate position. The output member shifts an opposite direction when the solenoid is energized with electrical current having opposite polarities.

Yet another aspect of the present invention is a shifter for vehicles including a base structure and a shift lever movably mounted to the base for movement between at least PARK, REVERSE, NEUTRAL and DRIVE positions. The shifter also includes a sensor that is configured to determine a position of the shift lever relative to the base, and a shift gate defining at least PARK, REVERSE, NEUTRAL and DRIVE positions. A powered pawl includes a pawl member that is movable between at least a NEUTRAL position and at least first and second positions. The pawl member is biased to the NEUTRAL position such that the pawl member shifts to the NEUTRAL position when no power is supplied to the powered pawl, and shifts to the first and second positions when the powered pawl is actuated. The shifter further includes a controller configured to actuate the powered pawl to control movement of the shift lever relative to the base. The controller locks the powered pawl when the pawl member engages the NEUTRAL position of the shift gate to prevent movement of the shift lever from the NEUTRAL position, unless the controller receives a signal indicating that a brake pedal is depressed.

BRIEF DESCRIPTION OF THE DRAWINGS

FIG. 5 is a top view of a solenoid according to one aspect of the present invention;

FIG. 6 is a cross-sectional view of the solenoid of FIG. 5;

FIG. 7 is a side elevational view of the solenoid of FIG. 6; and

FIG. 8 is an exploded view of the solenoid of FIG. 5.

DETAILED DESCRIPTION OF PREFERRED EMBODIMENT

Figure 1:
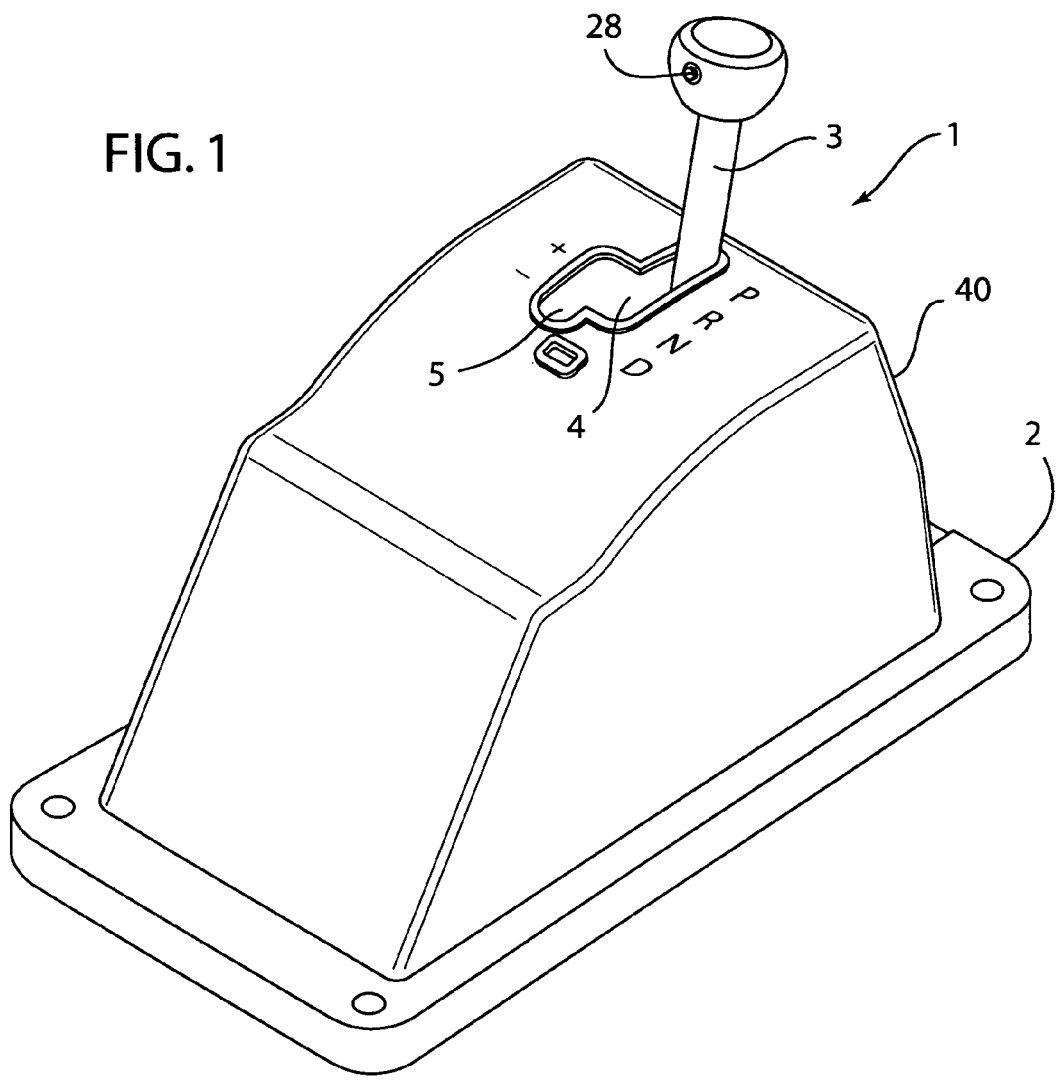
FIG. 1 is a perspective view of a shifter according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 10/762,837, filed Jan. 22, 2004, entitled SOLENOID WITH NOISE REDUCTION, and U.S. patent application Ser. No. 10/820,424, filed Apr. 8, 2004, entitled VEHICLE SHIFTER, the entire contents of each of which are incorporated herein by reference.

With reference to FIG. 1, a shifter 1 according to one aspect of the present invention includes a base 2, and a shift lever 3 that is movably mounted to the base 2 for movement between a plurality of gear positions. In the illustrated example, the shift lever 3 is movable between an "automatic" lane 4 having a plurality of gear positions "PARK", "REVERSE", "NEUTRAL" and "DRIVE", and a "manual" lane 5 having upshift and downshift positions "+" and "−" that permit the operator to shift the transmission up or down one gear.

Figure 2:
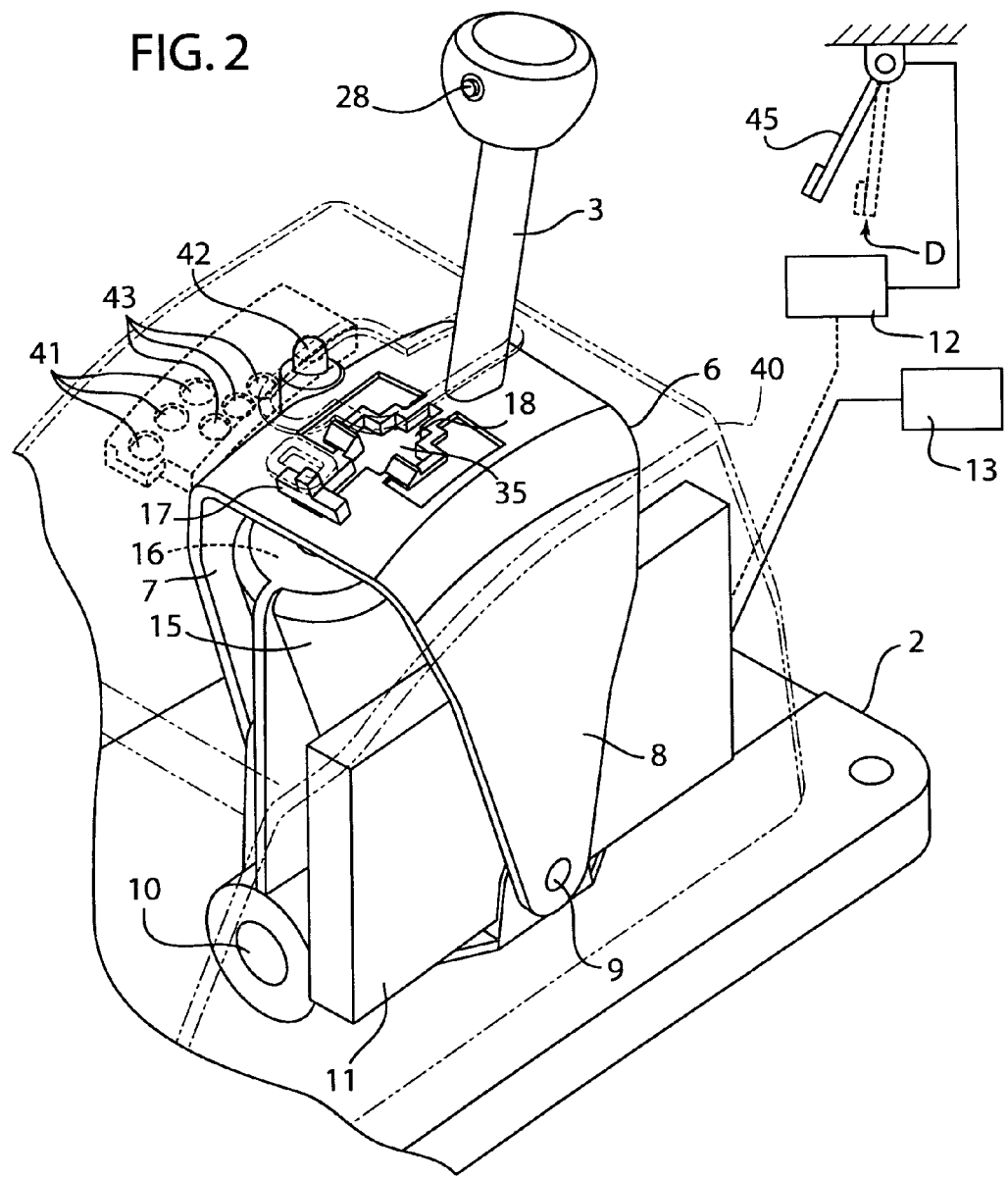
FIG. 2 is a partially schematic, fragmentary perspective view of the shifter of FIG. 1.

With further reference to FIG. 2, shift lever 3 includes a saddle-shaped lower portion 6 including downwardly extending portions 7 and 8 that pivotably mount the lever 3 to the base 2 at pivot 9. The pivot 9 provides for fore and aft movement of the shift lever 3, and a second pivot 10 provides side-to-side movement of shift lever 3. A sensor 11 such as a hall effect rotational sensor provides a signal to the vehicle controller 12 such that the controller 12 can determine the position of the shift lever 3 about the axis 9 and the axis 10.

A solenoid 16 is mounted in housing 15, and has an output member 22 with a pawl member 17 mounted thereto. During operation, pawl member 17 shifts with output member 22 as solenoid 16 is actuated. The pawl member 17 is operably connected to the power source 13 of the vehicle, and interacts with a shift gate 18 to control movement of the shift lever 3. With further reference to FIGS. 5-8, solenoid 16 includes a first spring 20 and second spring 21. Springs 20 and 21 act on a permanent magnet forming a disk portion 14 of movable member 19 to bias the member 19 to a central portion. The pawl member 17 is mounted to the output member 22 of solenoid 16. The solenoid 16 includes a coil 23 that can be energized with positive electrical current to create a force on magnet 14 and extend the output member 22 in the direction of arrow "A" (FIG. 6), compressing spring 21. Alternately, negative electrical current can be sent through coil 23 to retract the output member 22 in the direction of arrow "B", thereby compressing spring 20. Thus, output member 22 (and pawl member 17) have three positions, a NEUTRAL position when coil 23 is not energized, an extended position when coil 23 is energized with positive electrical current, and a retracted position when coil 23 is energized with negative electrical current.

Figure 3:
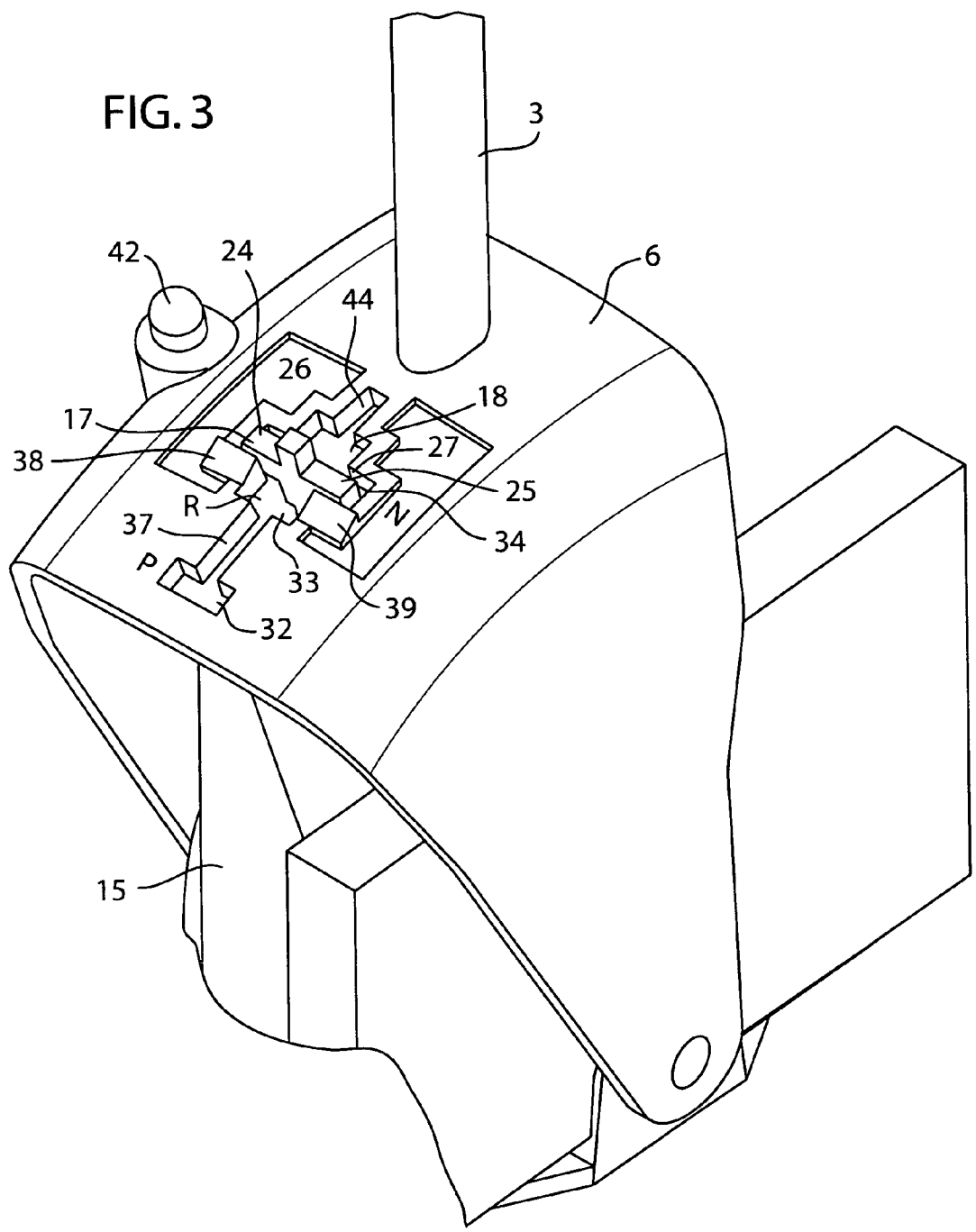
FIG. 3 is a partially fragmentary view of the shifter of FIG. 1.

With reference to FIG. 3, when shift lever 3 is in the NEUTRAL position and solenoid 16 is retracted, pawl member 17 retracts and the transversely extending cross portions 24 and 25 of pawl member 17 engage the enlarged portions 26 and 27 of shift gate 18, thereby locking shift lever 3 in the NEUTRAL position. Controller 12 is configured to prevent movement of the solenoid 16 from the retracted position when in the NEUTRAL lock, unless the button 28 is pushed, and the brake pedal 45 of the vehicle is also depressed to the position "D". A sensor (not shown) provides a signal to controller 12 when pedal 45 is depressed to the position "D". In the illustrated example, the solenoid 16 retracts the pawl member 17 to the position illustrated in FIG. 3 when a negative current is applied to the coil 23.

Figure 4:
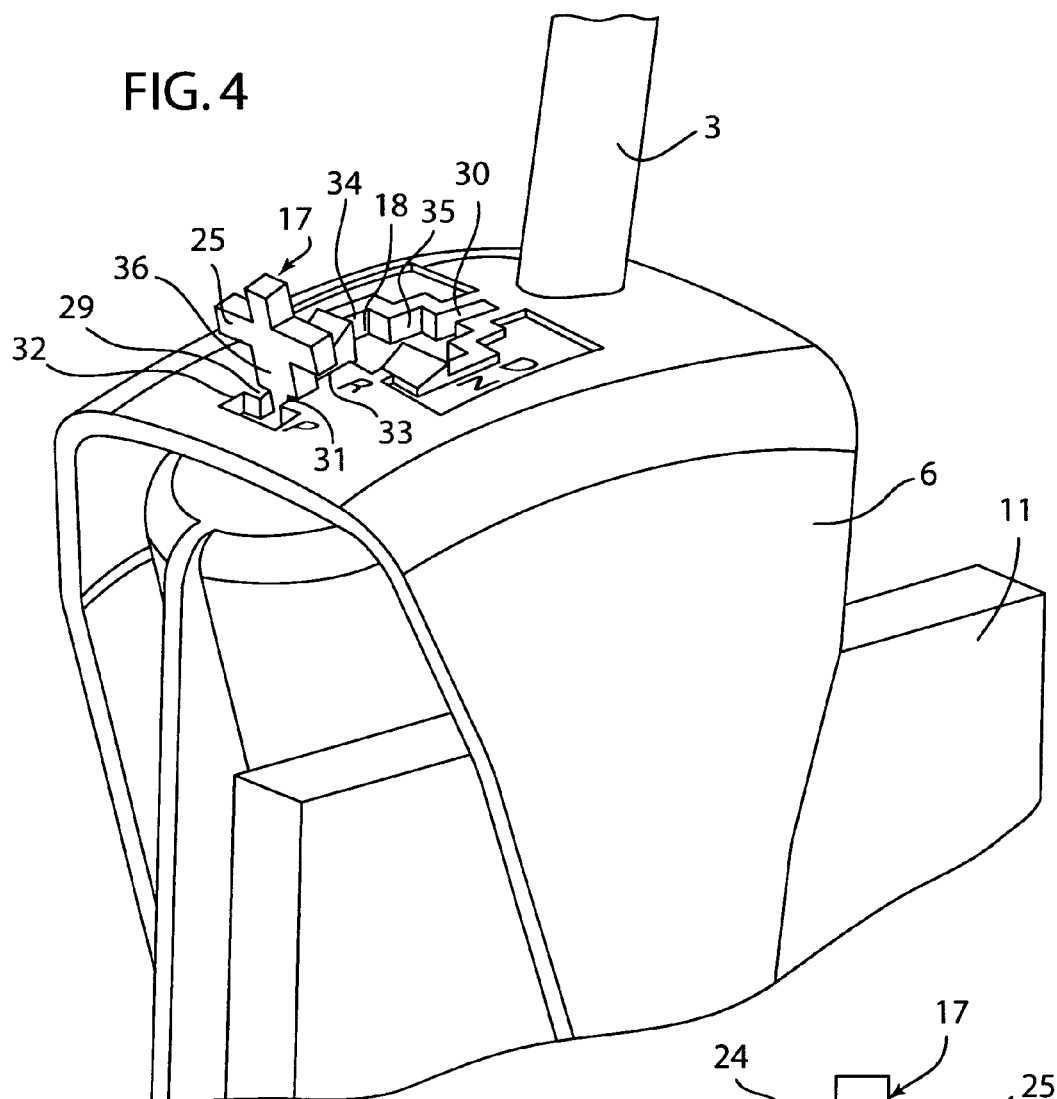
FIG. 4 is a partially fragmentary view of the shifter of FIG. 1.
Figure 4A:
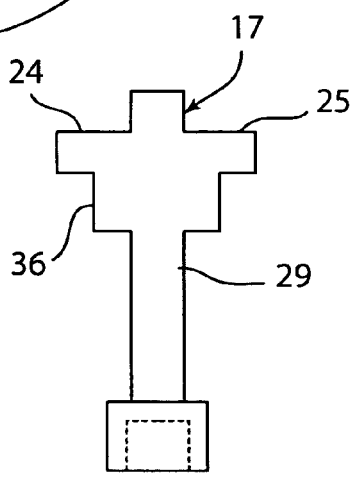
FIG. 4A is an enlarged view of the pawl member.

With further reference to FIGS. 4 and 4A, pawl member 17 includes a narrow portion 29 that fits between narrow portions 30 and 31 of shift gate 18. When button 28 is depressed, and a positive current is applied to the solenoid 16, the pawl member 17 is extended to the position illustrated in FIG. 4. When in the extended position, the narrow portion 29 of pawl member 17 interacts with the shift gate 18. Because the narrow portion 29 is somewhat narrower than the narrow-most portions 30 and 31 of gate 18, the shift lever 3 can be moved fore and aft without restriction when pawl member 17 is in the extended, unlocked position illustrated in FIG. 4. The shift gate 18 also includes an enlarged first portion 32 providing a "PARK" position, and a second portion 33 providing a "REVERSE" position. An enlarged portion 34 provides a "NEUTRAL" position, and a somewhat narrower portion 35 provides for a "DRIVE" position.

The intermediate portion 36 of pawl member 17 has a width that is slightly less than the PARK portion 32 of opening 18, and also slightly less than the REVERSE portion 33 of opening 18. When solenoid 16 is not energized (i.e., in the intermediate position) and shift lever 3 is in the PARK or REVERSE position, the portion 36 will engage the gate 18. The intermediate portion 36 has a width that locks the shift lever 3 in the PARK opening 32, and REVERSE portion 33 of gate 18. Thus, when the solenoid 16 is not energized, the intermediate portion 36 of pawl member 17 will lock the shift lever 3 in the PARK position. If the solenoid is not activated, and the intermediate portion 36 is positioned in the REVERSE portion 33 of opening 18, the narrow portion 37 of gate 18 will prevent movement from the REVERSE position 33 to the PARK position 32. However, the ramps 38 and 39 will engage the cross portions 24 and 25 of gate member 17, thereby causing the pawl member 17 to extend, permitting movement of the shift lever from the REVERSE portion 33 of opening 18 to the NEUTRAL portion 34 of opening 18.

With reference to FIG. 2, housing 40 includes a plurality of detents formed by depressions 41 on a lower surface. A spring loaded plunger 42 engages the depressions 41 to provide a dent to retain the shift lever 3 in the desired gear position. The depressions 41 correspond to the "+" and "−" gear positions in the second shift lane 5 (FIG. 1), and depressions 43 correspond to the "PARK", "REVERSE", "NEUTRAL" and "DRIVE" positions in the first or "automatic" shift lane 4.

During operation, controller 12 is configured to retract the solenoid 16 to the position illustrated in FIG. 3 when in the NEUTRAL position. The controller 12 will not permit movement of the solenoid from the retracted position unless the button 28 is depressed, and the vehicle's brake pedal is also depressed. Controller 12 thereby locks the shift lever 3 in the NEUTRAL position. Also, during operation the shift lever 3 can be moved to the DRIVE position 35, and then rotated transversely about pivot 10 into the second or "manual" lane 5. The sensors 11 provide a single to the controller 12 indicating that the shift lever 3 is in the second or manual lane 5, such that the controller 12 interprets movements of the shift lever 3 in the forward and reverse directions to be an upshift "+" or downshift "−" signal when in the second lane 5. When the shift lever 3 is in the "manual" lane 5, the controller 12 shifts the pawl member 17 to the extended (unlocked) position, such that the narrow portion 29 of pawl member 17 engages the gate 18. The narrow portion 29 of pawl member 17 fits into the narrow end portion 44 of gate 18, thereby permitting fore and aft movement of shift lever 3 in the manual shift lane 5. The solenoid 16 and pawl member 17 provide a NEUTRAL lock and PARK lock utilizing the three positions of the solenoid 16.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shifter for vehicles, comprising:
a base structure;
a shift lever movably mounted to the base structure;
a shift gate controlling movement of the shift lever between a plurality of control positions including at least PARK, NEUTRAL and DRIVE control positions;
a powered pawl having a pawl member configured to engage the shift gate, the pawl member defining a first position relative to the shift gate wherein the shift lever is locked in the NEUTRAL position, a second position relative to the shift gate wherein the shift lever is movable between the PARK, NEUTRAL and DRIVE positions, and a centered neutral third position positioned between the first and second positions, the pawl member being biased to the third position when no power is applied to move the powered pawl and, when in the third position, locking the shift lever in the PARK position; and at least one solenoid for selectively moving the pawl member from the third position to the first position when a first current is applied and for selectively moving the pawl member from the third position to the second position when a different second current is applied.

2. The shifter of claim 1, wherein:
the at least one solenoid includes a single solenoid that moves the pawl member between the first, second and third positions.

3. A shifter for vehicles, comprising:
a base structure;
a shift lever movably mounted to the base structure;
a shift gate controlling movement of the shift lever between a plurality of control positions including at least PARK, NEUTRAL and DRIVE control positions;
a powered pawl having a pawl member configured to engage the shift gate, the pawl member defining a first position relative to the shift gate wherein the shift lever is locked in the NEUTRAL position, a second position relative to the shift gate wherein the shift lever is movable between the PARK, NEUTRAL and DRIVE positions, and a third position relative to the shift gate wherein the pawl member locks the shift lever in the PARK position;
the powered pawl including a solenoid that moves the pawl member between the first, second and third positions; the solenoid retracts to move the pawl member to the first position when the solenoid is energized by electrical current of a first polarity, the solenoid extending to move the pawl member to the second position when the solenoid is energized by electrical current having a polarity opposite the first polarity.

4. The shifter of claim 3, wherein:
the solenoid positions the pawl member in the third position if the solenoid is not energized.

5. The shifter of claim 4, wherein:
the pawl member is biased out towards the third position.

6. The shifter of claim 3, wherein:
the shift gate is positioned on the shift lever and the solenoid is mounted on the base.

7. The shifter of claim 6, wherein:
the pawl member includes a first portion having a first width, a second portion having a second width, and a third portion having a third width, wherein the first width is greater than the second and third widths, and wherein the third width is greater than the second.

8. The shifter of claim 7, wherein:
the shift gate comprises an aperture having NEUTRAL lock surfaces configured to engage the first portion of the pawl member when the pawl member is in the first position to thereby lock the shift lever in the NEUTRAL position.

9. The shifter of claim 8, wherein:
the aperture further includes PARK lock surfaces configured to engage the third portion of the pawl member to lock the shift lever in the PARK position when the pawl is in the third position.

10. A shifter for vehicles, comprising:
a base structure;
a shift lever movably mounted to the base structure;
a shift gate;
a pawl member configured to engage the shift gate and control movement of the shift lever relative to the base;
a solenoid having a movable output member operably connected to the pawl member, wherein the movable output member is biased towards an intermediate position, the output member shifting in opposite directions when the solenoid is energized with electrical current having opposite polarities.

11. The shifter of claim 10, wherein:
the solenoid includes at least one resilient member biasing the pawl member to the intermediate position.

12. The shifter of claim 10, wherein:
the solenoid includes first and second springs biasing the pawl member to the intermediate position.

13. The shifter of claim 10, wherein:
the shift gate defines a NEUTRAL position wherein the shift lever is locked in a NEUTRAL position, and the pawl member has a first portion configured to engage the NEUTRAL position of the shift gate and prevent movement of the shift lever; and including:
a controller operably coupled to the solenoid and controlling electrical current to the solenoid, wherein:
the controller is configured to retain the solenoid such that the first portion of the pawl member engages the NEUTRAL position of the shift gate and locks the shift lever in the NEUTRAL position unless a brake pedal of the vehicle is depressed.

14. The shifter of claim 13, wherein:
the shift gate defines PARK and REVERSE positions;
the pawl member includes a second portion configured to engage the PARK and REVERSE positions of the shift gate and prevent movement of the shift lever.

15. The shifter of claim 14, wherein:
the solenoid defines extended and retracted positions; and
the first portion of the pawl member is configured to engage the NEUTRAL position of the shift gate and prevent movement of the shift lever when the solenoid is in a selected one of the extended and retracted positions.

16. The shifter of claim 15, wherein:
the first portion of the pawl member is configured to engage the NEUTRAL position of the shift when the solenoid is in the retracted position.

17. The shifter of claim 16, wherein:
the shift gate includes an intermediate position between the PARK and REVERSE positions; and
the pawl member includes a third portion configured to engage the intermediate portion to permit movement of the pawl member between the PARK and REVERSE positions.

18. The shifter of claim 17, wherein:
the third portion of the pawl member engages the shift gate when the solenoid is in the extended position.

19. The shifter of claim 18, wherein:
the shift gate comprises an aperture through a portion of the shift lever and moves with the shift lever; and
the solenoid is mounted to the base.

20. The shifter of claim 10, wherein:
the shift lever is pivotably mounted to the base for rotational movement about first and second axis, the shift lever movable along a first shift path defining PARK, REVERSE, NEUTRAL and DRIVE positions, and a second shift path defining UPSHIFT and DOWNSHIFT gear positions.

21. A shifter for vehicles, comprising:
a base structure;
a shift lever movably mounted to the base for movement between at least PARK, REVERSE, NEUTRAL and DRIVE positions;

a sensor configured to determine a position of the shift lever relative to the base;

a shift gate defining at least PARK, REVERSE, NEUTRAL and DRIVE positions;

a powered pawl including a pawl member movable between at least an intermediate NEUTRAL position and at least first and second positions on opposite sides of the intermediate NEUTRAL position, wherein the pawl member is biased to the NEUTRAL position such that the pawl member shifts to the NEUTRAL position when no power is supplied to the powered pawl, and shifts to the first and second positions when the powered pawl is selectively actuated;

a controller configured to apply a first electrical current to move the powered pawl from the intermediate NEUTRAL position to the first position to control movement of the shift lever relative to the base, and configured to apply a different second electrical current to move the powered pawl from the intermediate NEUTRAL position to the second position to control movement of the shift lever relative to the base; and wherein:

the controller locks the powered pawl when the pawl member engages the NEUTRAL position of the shift gate to prevent movement of the shift lever from the NEUTRAL position, unless the controller receives a signal indicating that a brake pedal is depressed.

22. The shifter of claim 21, wherein:
the shift gate is movably mounted to the base structure and the powered pawl is mounted to the base structure.

23. The shifter of claim 21, wherein:
the powered pawl includes a solenoid having a movable member.

24. The shifter of claim 23, wherein:
the first position comprises an extended position of the movable member, and the second position comprises a retracted position of the movable member.

* * * * *